(12) United States Patent
Rirschl et al.

(10) Patent No.: US 11,639,827 B2
(45) Date of Patent: May 2, 2023

(54) METHOD OF DRYING A TRANSPORT AND STORAGE CONTAINER

(71) Applicants: Christoph Rirschl, Herne (DE); Konrad Dreesen, Titz (DE)

(72) Inventors: Christoph Rirschl, Herne (DE); Konrad Dreesen, Titz (DE)

(73) Assignee: GNS GESELLSCHAFTFUER NUKLEAR-SERVICE mbH, Essen (DE)

( * ) Notice: Subject to any disclaimer, the term of this patent is extended or adjusted under 35 U.S.C. 154(b) by 361 days.

(21) Appl. No.: 17/019,876

(22) Filed: Sep. 14, 2020

(65) Prior Publication Data

US 2021/0080180 A1   Mar. 18, 2021

(30) Foreign Application Priority Data

Sep. 16, 2019   (EP) ..................................... 19197547

(51) Int. Cl.
| | |
|---|---|
| *F26B 21/14* | (2006.01) |
| *F26B 5/12* | (2006.01) |
| *G05D 7/06* | (2006.01) |
| *G21F 5/06* | (2006.01) |

(52) U.S. Cl.
CPC ................ *F26B 21/14* (2013.01); *F26B 5/12* (2013.01); *G05D 7/0623* (2013.01); *G05D 7/0676* (2013.01); *G21F 5/06* (2013.01)

(58) Field of Classification Search
CPC ......... F26B 21/14; F26B 5/12; G05D 7/0623; G05D 7/0676; G21F 5/06; G21F 5/10; G21F 9/34; G21F 5/008; G21F 9/00; G21F 9/36; B65D 88/747
See application file for complete search history.

(56) References Cited

U.S. PATENT DOCUMENTS

| | | | |
|---|---|---|---|
| 9,117,558 B1 * | 8/2015 | Pennington | ............... G21F 5/10 |
| 10,229,764 B2 | 3/2019 | Singh | |
| 2017/0154690 A1 * | 6/2017 | Hummel | ................ G21C 19/26 |

* cited by examiner

*Primary Examiner* — Jessica Yuen
(74) *Attorney, Agent, or Firm* — Andrew Wilford

(57) ABSTRACT

A method of drying transport and/or storage containers for radioactive waste has the first step draining or pumping residual water out of the container holding the nuclear waste. Then gas is evacuated from the interior of the drained or pumped out container interior. Thereafter an inert gas is fed into the drained or pumped out container interior while continuing to evacuate gas from the container interior. During the evacuation and/or infeeding of inert gas a rate of evacuation and/or a rate of infeed of the inert gas is controlled such such that an inert-gas content in the interior of the container is between 50 and 95 vol %.

10 Claims, 1 Drawing Sheet

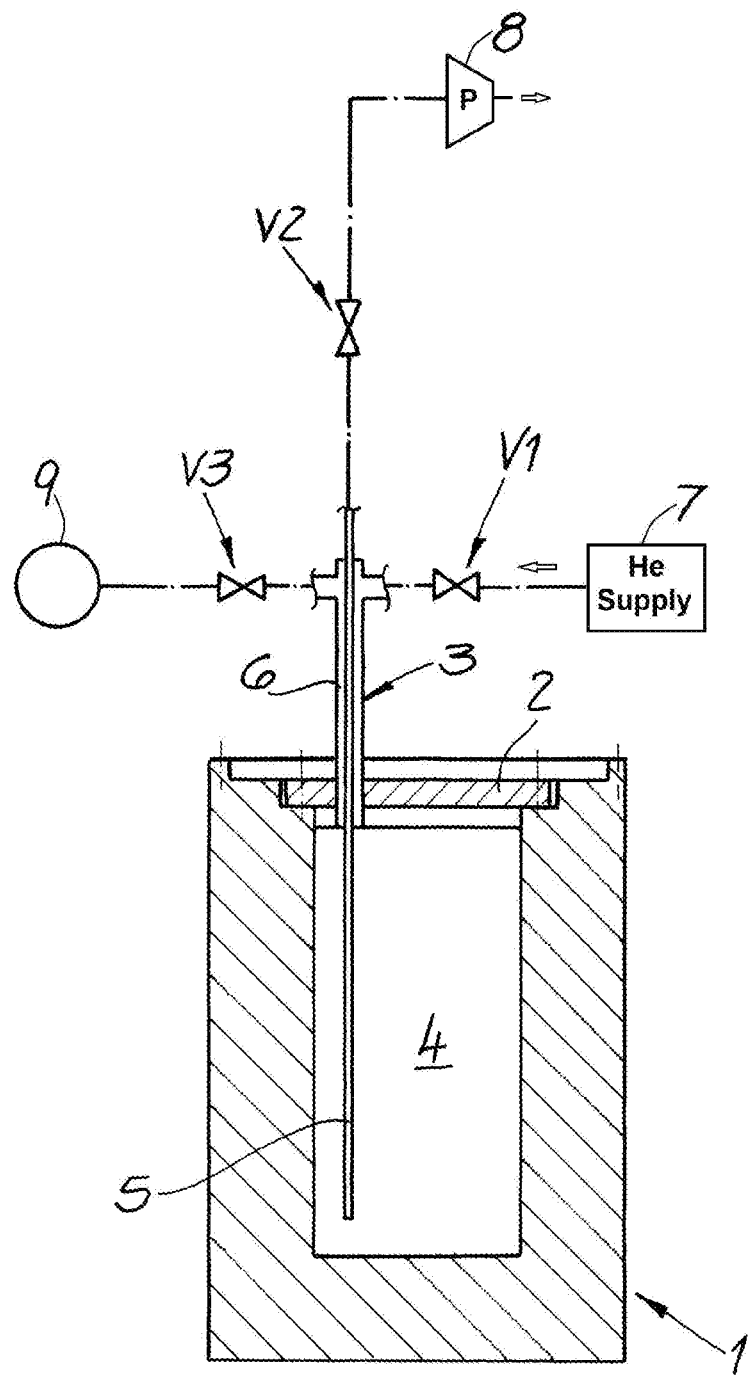

METHOD OF DRYING A TRANSPORT AND STORAGE CONTAINER

FIELD OF THE INVENTION

The present invention relates to a method of drying a container. More particularly this invention concerns a transport/storage container for nuclear waste.

BACKGROUND OF THE INVENTION

A container for transporting and/or storing spent nuclear fuel rods is a massive upwardly open vessel having a similarly massive cover or lid. The vessel is normally placed in a storage pool where the rods are held in baskets with the water serving for heat dissipation and shielding, and a basket of the rods is moved under water into the vessel that is then lifted out of the pool, then either drained or pumped out and covered. The interior of the container is then evacuated or maintained subatmospheric.

Methods of the above-described type for drying transport and/or storage containers are fundamentally known from practice in different variants. The water still remaining in the container is then removed from the container by drying, in particular by vacuum drying.

It is also already known to remove the water still remaining in the container using a gas conducted through the container interior, in particular an inert gas such as nitrogen or helium. For this, reference can be made to U.S. Pat. No. 10,229,764, for example. In the measures described here, the gas is first conducted through the container interior for drying and after this measure has been completed the container is placed under vacuum.

The drying methods known to this extent are in some cases relatively complex and therefore also costly. In addition, many known drying methods are characterized by insufficient drying efficiency. This is especially true for transport and/or storage containers with a high thermal output.

OBJECTS OF THE INVENTION

It is therefore an object of the present invention to provide an improved method of drying a transport and storage container.

Another object is the provision of such an improved method of drying a transport and storage container that overcomes the above-given disadvantages, in particular that can be carried out in a simple and inexpensive manner that is characterized by high drying efficiency and that, above all, is also suitable for containers with a high thermal output.

SUMMARY OF THE INVENTION

A method of drying transport and/or storage containers for radioactive waste has according to the invention the steps of
a) draining or pumping residual water out of the container holding the nuclear waste,
b) evacuating gas from the interior of the drained or pumped out container interior,
c) thereafter feeding an inert gas into the drained or pumped out container interior while continuing to evacuate gas from the container interior, and
d) controlling a rate of evacuation and/or a rate of infeed of the inert gas such that an inert-gas content in the container interior is 50 to 95% by volume, in particular 55 to 90% by volume, preferably 60 to 85% by volume, and more preferably 65 to 85% by volume. According to one recommended embodiment variant, the inert gas content or the helium content in the container interior is 70 to 80% by volume. When inert gas is mentioned below, within the scope of the invention this means very generally preferably gaseous helium.

The inventive method relates in particular to the drying of transport and/or storage containers for spent fuel elements. The inventive method is recommended for containers with high heat outputs, specifically heat outputs between 12.5 kW to 42 kW, in particular heat outputs between 15 kW and 40 kW, and especially heat outputs between 20 kW and 40 kW, for example between 25 kW and 40 kW. The method can be carried out or is preferably carried out such that fuel-rod-cladding tube temperatures of 320 to 400° C., and in particular 350 to 400° C., are or can be maintained.

In the context of the inventive method, the container is first drained or pumped out. After this draining of the container, a first evacuation of the container interior, and thus generation of a first negative pressure or vacuum in the container interior, is carried out, first without feeding in helium. This first evacuation is usefully carried out to a pressure in the container interior of 8 to 30 mbar, in particular 8 to 25 mbar, preferably 8 to 20 mbar, and particularly preferably 10 to 20 mbar. According to one highly recommended embodiment of the invention, the pressure or negative pressure generated here is 8 to 12 mbar, for example 10 mbar. Carrying out the first evacuation over a period of 4 to 12 hours, in particular 5 to 10 hours, has been found effective.

It is recommended that after the first evacuation of the container interior, and before the gaseous helium is fed in, the evacuation of the container interior is interrupted for a period of time t. The pressure increase Δp in the container interior is usefully measured during this time period t, specifically in particular for determining the filling pressure $p_{tot}$ to be set for the subsequent introduction of the gaseous helium.

According to one recommended embodiment of the invention, after the first evacuation or generation of negative pressure, the water-vapor partial pressure $p_{H2O}$ in the container interior is calculated by means of the measured pressure increase Δp. Usefully, the required filling pressure tot for introduction the helium to achieve the desired helium content vol. % (50 to 95 vol. %) in the container is calculated from this calculated water-vapor partial pressure $p_{H2O}$. One embodiment for this calculation is disclosed below. The desired helium content vol. % is in the vol. % ranges recited above.

It is also within the scope of the invention that after the first evacuation or generation of negative pressure, and preferably after the measurement of the pressure increase, the inventive continuous evacuation of the container interior and the simultaneous continuous supplying of gaseous helium are carried out. The evacuation and the supplying of gaseous helium are preferably carried out such that the pressure in the container interior is between 8 and 30 mbar, in particular between 8 and 25 mbar, preferably between 8 and 20 mbar, and more preferably between 10 and 20 mbar. According to one recommended embodiment, the pressure in the container space is between 8 and 12 mbar, for example 10 mbar. It is furthermore within the scope of the invention that this pressure is maintained constant or is maintained essentially constant during the continuous evacuation and the simultaneous continuous supplying of gaseous helium. According to one particularly recommended embodiment of the invention, the continuous evacuation and the continuous introduction of gaseous helium is carried out over a period of at least three hours, preferably at least four hours, more preferably at least 4.5 hours, and very preferably at least 5 hours. According to one proven embodiment of the invention, the continuous evacuation and the simultaneous continuous introduction of gaseous helium takes place over a period of 3 to 35 hours, in particular over a period of 3.5 to 32 hours, and preferably over a period of 4 to 31 hours, very preferably over a period between 5 and 30 hours. Usefully, the pressure specified above in the container interior is maintained over this period of time and is preferably maintained constant or maintained essentially constant. It is recommended that the pressure in the container interior is maintained for at least 95% of this period and is preferably maintained constant or maintained essentially constant.

It is within the scope of the invention that after the desired degree of dryness has been reached in the container interior, the continuous evacuation is terminated and then gaseous helium is fed into the container interior until a predetermined pressure has been achieved in the container interior. The degree of dryness is usefully measured by measuring the pressure increase for the pressure in the container interior. To this end, both the continuous evacuation and the introduction of gaseous helium are preferably interrupted and the pressure increase in the container is preferably measured by at least one pressure sensor. Thus after the desired degree of dryness has been reached in the container interior, the continuous evacuation is usefully terminated and then gaseous helium continues to be fed into the container interior. It is recommended that the container interior is filled with gaseous helium to an interior pressure of 850 to 1100 mbar, in particular to an interior pressure of 900 to 1050 mbar, and preferably to an interior pressure of 900 to 1000 mbar. The drying process is then preferably terminated.

It is within the scope of the inventive method that the container is closed during the continuous evacuation of the container interior and the simultaneous continuous supplying of gaseous helium, and in particular is closed with at least one or with only on primary cover. It is also within the scope of the invention that the container is closed, or is closed with at least one primary cover, in particular with only one primary cover, during the first evacuation of the container interior and/or during the measurement of the pressure increase after the first evacuation and/or during the measurement of the pressure increase to determine the degree of dryness and/or when the container interior is finally filled with gaseous helium. The container is preferably evacuated and the helium is fed into the container through the primary cover of the container. According to one recommended embodiment of the invention, the suction or evacuation of the container interior is carried out with at least one evacuation lance, the evacuation lance usefully extending through the primary cover of the container.

Feeding the gaseous helium into in the upper region of the container has been proven effective. The suction or evacuation of the container interior is recommended in the lower region of the container or of the container interior. According to one particularly recommended embodiment of the invention, the evacuation or evacuations and the introduction of the gaseous helium are carried out with at least one double lance made up of one outer tube and one inner tube surrounded by the outer tube. This double lance usefully extends through the primary cover of the container. It is recommended that the inner tube extends to a lower region of the container and that the outer tube terminates in the upper region of the container. The container interior is usefully evacuated via the inner tube and the helium is preferably fed into the container interior via the outer tube. It is within the scope of the invention that the free volume of the container interior is 2 to 8 m³, preferably 3 to 6 m³. Free volume means the interior volume of the container, without support basket and fuel elements.

It was stated above that, according to one preferred embodiment of the invention, evacuation is interrupted for a period t after the first evacuation of the container interior and before the gaseous helium is fed in, and that during this period t the pressure increase $\Delta p$ in the container interior is measured for determining the filling pressure $p_{tot}$ to be set for the introduction of the helium. This determination is explained in greater detail using the following embodiment or exemplary calculation.

In the context of the embodiment, the filling pressure $p_{tot}$ for introduction helium in order to achieve a helium content of 75% by volume in the container atmosphere should be determined. The following applies for the required partial pressure ratio of the helium partial pressure $p_{He}$ to the water-vapor partial pressure $p_{H2O}$:

$$p_{He}/p_{H2O} = 75/25 = 3$$

From this it follows for the helium partial pressure:

$$p_{He} = 3 \times p_{H2O}$$

and for the required filling pressure $p_{tot}$ for introduction the helium:

$$p_{tot} = p_{He} + p_{H2O} = 4 \times p_{H2O}.$$

The maximum water-vapor partial pressure $p_{H2O}$ to be set during ongoing vacuum drying with a suction speed of >200 m³/h (effective pumping speed $S_{eff} = 200 \times 0.573 = 114.6$ m³/h) is determined using a previous pressure increase measurement that in the present case is carried out over a period t of 15 minutes. The following applies to the evaporation rate $a_{PV}$ in hPa×L/s:

$$a_{PV} = p \times V$$

$$a_{PV} = \Delta p \times V/t$$

Here, $\Delta p$ stands for the pressure increase in hPa, V for the free container interior volume in L, and t for the measurement time in seconds. The following then applies for the water-vapor partial pressure $p_{H2O}$:

$$p_{H2O} = a_{PV}/S_{eff} = \Delta p \times V/(t \times S_{eff})$$

$$p_{H2O} = \Delta p \times 5220/(900 \times 31.8).$$

The filling pressure $p_{tot} = 4 \times p_{H2O}$ to be set to ensure a helium content of 75% by volume through introduction helium is thus calculated from the pressure increase over 15 minutes as:

$$p_{tot} = 0.73 \times \Delta p.$$

The invention is based on the discovery that the inventive drying method enables very simple and inexpensive, and at the same time very precise and functionally reliable, drying of the container interior of a transport and/or storage container. The method is characterized by a surprisingly high drying efficiency. In this respect, the inventive method has considerable advantages over drying methods known to date from practice or from the prior art. The outlay for equipment for carrying out the drying method is relatively low in view of the success achieved. The inventive method is distinguished by high functional reliability and low susceptibility to failure. The drying process is particularly, but not exclusively, suitable for containers with a higher or high thermal output. The parameters according to the invention can be easily and reproducibly adhered to when carrying out the method. The cost of carrying out the inventive method is relatively low.

BRIEF DESCRIPTION OF THE DRAWING

The above and other objects, features, and advantages will become more readily apparent from the following description, reference being made to the accompanying drawing whose sole figure is a partially schematic vertical section through the container illustrating the system for drying it.

SPECIFIC DESCRIPTION OF THE INVENTION

As seen in the drawing, a transport and/or storage container 1 formed as massive upwardly open vessel has been loaded with unillustrated spent fuel elements in a basket. The loading was performed under water and the container 1 was first drained or pumped out. Preferably and here, a primary cover 2 closing the container 1 is attached to the container 1. Usefully and here, a double lance 3 extends through the primary cover 2 of the container 1 and leads into the container interior 4. It is recommended that here, the double lance 3 has a long inner tube 5 embodied as an evacuation lance that extends into the lower region of the container interior 4. As has proven itself and here, the inner tube 5 is surrounded by a short outer tube 6, this outer tube 6 opening into the upper region of the container 1 or preferably and here, at the bottom face of the primary cover 2.

According to the preferred embodiment and here, a supply 7 of gaseous helium is connected to the outer tube 6 via a valve V1. A vacuum pump 8 is preferably and here connected via the valve V2 to the inner tube 5. Furthermore, a pressure sensor 9 is preferably provided and here is provided, and is connected to the outer tube 6 and thus to the container interior 4 via the valve V3. The pressure sensor 9 is used in particular to measure any pressure increase Δp.

It is recommended that initially a first evacuation of the container interior 4 is carried out using the vacuum pump 8 with the valve V2 open and with the valves V1 and V3 closed. This first evacuation is usefully carried out to a pressure 4 to 10 mbar in the container interior. As has proven itself and here, this evacuation takes place over a period of 3 to 12 hours, in particular from 4 to 11 hours, and preferably from 5 to 10 hours. The evacuation is usefully interrupted for a period t after the first evacuation of the container interior 4 and before the gaseous helium is fed in. The period t may be 15 minutes, for example. During this period t, the pressure increase Δp in the container interior 4 is measured by the sensor 9 to determine the filling pressure $p_{tot}$ to be set for the gaseous helium feed. The pressure increase Δp is measured with the pressure sensor 9. To this end, the valve V2 to the vacuum pump 8 is closed and the valve V3 to the pressure sensor 9 is opened with the valve V1 still closed. The water-vapor partial pressure $p_{H2O}$ in the container interior 4 is preferably calculated from the measured pressure increase Δp, and the required filling pressure $p_{tot}$ for introducing the helium to achieve the desired vol. % content of the helium in the container 1 is calculated from this water-vapor partial pressure $p_{H2O}$. This has already been explained in greater detail above.

It is within the scope of the invention that after the first evacuation and after the pressure increase measurement, the inventive continuous evacuation of the container interior 4 and the simultaneous continuous supplying of gaseous helium into the container interior 4 are carried out. To this end, valves V1 and V2 are opened. This continuous evacuation and the simultaneous continuous supplying of gaseous helium is preferably carried out such that the pressure in the container interior 4 stays between 8 and 30 mbar, in particular between 10 and 20 mbar, and particularly preferably not less than 10 mbar. The continuous evacuation and the simultaneous continuous introduction of gaseous helium are usefully carried out over a period of at least 4 hours and, for example, over a period of 5 to 30 hours.

According to one recommended embodiment of the invention, after the desired degree of dryness has been reached in the container interior 4, the continuous evacuation is terminated by closing the valve V2 and then gaseous helium continues to be fed into the container interior 4 with the valve V1 open until a predetermined pressure is achieved. The desired degree of dryness can preferably be determined again via a pressure increase measurement by the pressure sensor 9. The container interior 4 is then usefully filled with gaseous helium to an interior pressure of 850 to 1100 mbar, preferably to an interior pressure of 900 to 1000 mbar. The drying process is now complete.

The figure shows that the introduction of helium takes place via the outer tube 6 of the double lance 3 at the upper end of the container interior 4, whereas the suction or evacuation takes place via the inner tube 5, designed as an evacuation lance, in the lower region of the container interior 4. This preferred embodiment has proven particularly useful in the context of the invention.

We claim:

1. A method of drying transport and/or storage containers for radioactive waste comprising the steps of:
   a) draining or pumping residual water out of the container holding the nuclear waste;
   b) evacuating gas from the interior of the drained or pumped out container interior to a pressure of 8 to 30 mbar;
   b') thereafter interrupting the evacuation of the interior of the container for a predetermined period while during the period measuring a pressure increase in the container to determine a filling pressure;
   c) thereafter feeding an inert gas into the drained or pumped out container interior to establish therein the filling pressure while continuing to evacuate gas from the container interior; and
   d) controlling a rate of evacuation and/or of a rate of infeed of the inert gas such that an inert-gas content in the container interior is 50 to 95% by volume.

2. The method according to claim 1, wherein between steps b) and c) a water-vapor partial pressure in the container interior is calculated from the measured pressure increase, and the required filling pressure for introduction the inert gas to achieve the inert gas or helium content vol. % of step d) in the container is calculated from the water-vapor partial pressure.

3. The method according to claim 1, wherein between steps b) and c) or after the pressure increase measurement, the continuous evacuation of the container interior and the simultaneous continuous supplying of inert gas is carried out such that the pressure in container interior is between 8 and 30 mbar.

4. The method according to claim 1 wherein step c) is carried out over a period of at least 3 hours.

5. The method according to claim 1, wherein, once a predetermined degree of dryness has been reached in the container interior, the evacuation is terminated and then the inert gas is fed into the container interior until a predetermined pressure is achieved therein.

6. The method according to claim 1, wherein, once a predetermined degree of dryness has been reached in the container interior, the evacuation is terminated and then the inert gas is fed into the container interior to a predetermined pressure of 850 to 1100 mbar.

7. The method according to claim 1, wherein the inert gas is fed in into the upper region of the container.

8. The method according to claim 1, wherein the evacuation of gas from the container interior is carried out in a lower region of the container through an evacuation lance.

9. The method according to claim 1, wherein the evacuation of gas and the introduction of the inert gas are carried out with at least one double lance made up of an outer tube and a longer inner tube surrounded by the outer tube, the inner tube extending into a lower region of the container and the outer tube opening into an upper region of the container.

10. The method according to claim 1, wherein the inert gas is helium.

\* \* \* \* \*